United States Patent [19]

Fujita

[11] 3,715,468

[45] Feb. 6, 1973

[54] COLOR VIDEO SIGNAL RECORDING AND REPRODUCING SYSTEM

[75] Inventor: Mitsuo Fujita, Tokyo, Japan

[73] Assignee: Victor Company of Japan, Ltd., Yokohama, Japan

[22] Filed: Nov. 10, 1970

[21] Appl. No.: 88,350

Related U.S. Application Data

[63] Continuation-in-part of Ser. No. 12,301, Feb. 18, 1970.

[30] Foreign Application Priority Data

Feb. 21, 1969 Japan ....................44/12554
Nov. 11, 1969 Japan ....................44/89730

[52] U.S. Cl. ....................178/5.4 CD
[51] Int. Cl. ....................H04n 5/76
[58] Field of Search ....................178/5.4 CD, 6.6 A

[56] References Cited

UNITED STATES PATENTS

| | | | |
|---|---|---|---|
| R26,412 | 6/1968 | Dolby et al. | 178/5.4 |
| 2,921,976 | 1/1960 | Johnson | 178/6.6 |
| 3,040,125 | 6/1962 | Dillenburger et al. | 178/6.6 |
| 3,084,224 | 4/1963 | Sanford | 179/100.2 |
| 3,241,084 | 3/1966 | Klingberg | 331/111 |
| 3,312,780 | 4/1967 | Hurst et al. | 178/5.4 |
| 3,359,364 | 12/1967 | Kihara | 178/5.4 |
| 3,507,983 | 4/1970 | Leman | 178/5.4 |
| 3,528,026 | 9/1970 | Groendycke | 331/11 |

*Primary Examiner*—Robert L. Richardson
*Attorney*—Louis Bernat

[57] ABSTRACT

In a color video signal recording and reproducing system, a color video signal is separated into a luminance signal and a chrominance signal. A frequency modulated luminance signal is superimposed on a frequency converted chrominance signal. This superimposed signal is recorded on a magnetic medium and reproduced therefrom. The chrominance signal is converted into a signal having a frequency which makes beats inconspicuous. A signal, which is in opposite phase to the beats, is produced in order to eliminate the beats which are produced in the recording and reproducing processes. The opposite phase signal are added to the luminance signal on either the recording side or the reproducing side of the system.

14 Claims, 15 Drawing Figures

INVENTOR
MITSUO FUJITA
BY
ATTORNEY

INVENTOR
MITSUO FUJITA

BY [signature] ATTORNEY

INVENTOR

MITSUO FUJITA

BY [signature] ATTORNEY

INVENTOR
MITSUO FUJITA
BY [signature] ATTORNEY

INVENTOR
MITSUO FUJITA

BY Louis Bernat ATTORNEY

COLOR VIDEO SIGNAL RECORDING AND REPRODUCING SYSTEM

This is a Continuation-In-Part application of the copending U.S. application Ser. No. 12,301, "COLOR VIDEO SIGNAL RECORDING AND REPRODUCING SYSTEM," filed on Feb. 18, 1970, by the same applicant and assigned to the same assignee.

This invention relates to a color video signal recording and reproducing system, and more particularly, to system for recording and reproducing color video signals, without distortions due to beats which occur in simple type video tape recorders.

Generally, color video signal recording and reproducing systems are classified into (1) systems wherein the luminance signal and chrominance components are recorded and reproduced in separate tracks on the magnetic medium, and (2) systems wherein the color video signal is frequency modulated and thereafter recorded and reproduced. The first system has an essential disadvantage since it uses twice as much magnetic tape as the second system. The second system has a disadvantage when a simple type video tape recorder uses relatively low and narrow frequency band, since beats are liable to be produced. These beats cause moires and degrade and the quality of the reproduced pictures.

To overcome the problems resulting from production of beats, when the second system is used for color-TV broadcasting, a high band system is employed. The FM carrier wave has a frequency which is higher than in the frequency of the low band system.

However, the relative speeds of the magnetic heads and the magnetic tape of a simple video tape recorder generally used in industrial application of color television are low. As a result, pronounced beats are often caused by the FM carrier wave and chrominance subcarrier.

The following factors are responsible for the production of beats. (1) There is a leaking of the frequency modulated component through the frequency modulator. (2) There is a leaking of the frequency modulated component through the frequency demodulator. (3) There is a folded spectrum in the second side band with respect to the chrominance subcarrier. (4) There is a non-linear characteristic of the low carrier wave FM transmission system. Of these factors, the fourth factor is responsible for the beats inevitably produced during the process of operation of the magnetic tape. Thus, it is impossible to wholly eliminate the beats of this type. However, it is not impossible to eliminate the beats caused by the factors (1) to (3) since they result from low carrier wave frequency modulation of video signals comprising carrier chrominance signals.

Further, an audio signal magnetic recording and reproducing apparatus generally uses a high frequency bias for recording the audio signals and, accordingly, has a comparatively good linear characteristic. In a conventional video tape recorder, however, video signals are directly recorded after being frequency modulated, without using the high frequency bias. The absence of the high frequency bias produces distortions in wave form. The distortion in wave form are produced due to nonlinearity of the magnetization curve (B–H curve) of the magnetic material coating the magnetic tape. As is well known, the magnetization curve is symmetrical with respect to the origin point and, therefore, the distortion components also become symmetrical distortion components. As a result, the distortion components thus produced mostly include the third distortion components.

The present invention is directed to an avoidance of the aforementioned disadvantage by frequency modulating the luminance signal and by directly recording the carrier chrominance signal.

Accordingly, an object of the invention is to provide a color video signal recording and reproducing system. Here an object is to satisfactorily record and reproduce color video signals by using a simple type of video tape recorder, and more particularly to avoid distortions due to beats.

Another object of the invention is to provide a color video signal recording and reproducing system which enables a correction of a large variation in the timing axis of a reproduced carrier chrominance signal.

A further object of the invention is to provide a color video signal recording and reproducing system which stabilizes the phase of a reproduced carrier chrominance signal, and more particularly to so stabilize such a phase, in a simple type video tape recorder which tends to cause a great variation in the timing axis of the signal.

Still another object of the invention is to provide a color video signal recording and reproducing system which minimizes differential gain and differential phase by separating the carrier chrominance signal from the luminance signal.

A still further object of the invention is to provide a color video signal recording and reproducing system in which a frequency is suitably selected for frequency conversion of the chrominance subcarrier so that the effects of beat disturbance may be minimized and made least conspicuous in a reproduced picture. The minimization of beat disturbance contributes to a raising of a recording level, and thence to an improvement in signal-to-noise ratio of the carrier chrominance signal.

Additional objects as well as features and advantages of the invention will become more evident from the description set forth hereinafter when considered in conjunction with the accompanying drawings, in which.

Figure 5A:
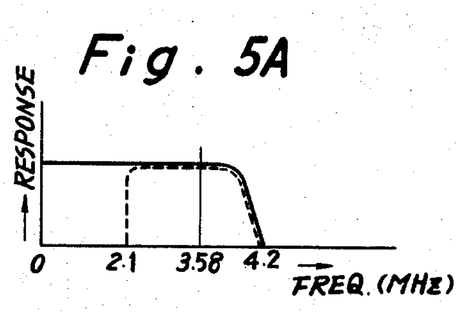
FIGS. 5A to 5G are views showing the spectra of signals produced on the recording side and reproducing side of systems constructed according to this invention.

One embodiment of the recording side of a system, constructed according to this invention, will b explained with reference to FIG.1. Here, an NTSC system color video signal (FIG.5A) is introduced through an input terminal 10 and applied to a low-pass filter 11 having an upper limit frequency of 3 MHz. The input is also applied to a band-pass filter 12 which passes the frequency band 3.1 to 4.1 MHz. A luminance signal (FIG.5B) is separated from the input color video signal at the low-pass filter 11 and thereafter is frequency modulated at a frequency modulator 13. At this time, the frequency deviation is selected to be about 3.5 to 4.5 MHz. The output of the frequency modulator 13 is applied to a high-pass filter 14, which removes therefrom the side bands below 1.2 MHz. The frequency modulated signal (FIG.5C) is applied to a mixer 15.

On the other band, a carrier chrominance signal (FIG.5D) is separated from the incoming color video signal at the band-pass filter 12, and thereafter is supplied to a frequency converter 16. There the carrier chrominance signal is frequency converted by the output signal (of about 4.3 MHz, for example) of a local oscillator 18. Then, the frequency conversion is applied to a band-pass filter 17 of the frequency band 0.2 to 1.2 MHz. Unnecessary components are removed from the output signal of the frequency converter 16 at the band-pass filter 17. This produces a carrier chrominance signal of the frequency band 0.2 to 1.2 MHz (FIG.5E) which is supplied to the mixer 15.

Figure 5B:
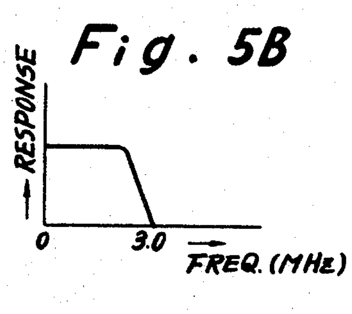
Figure 5C:
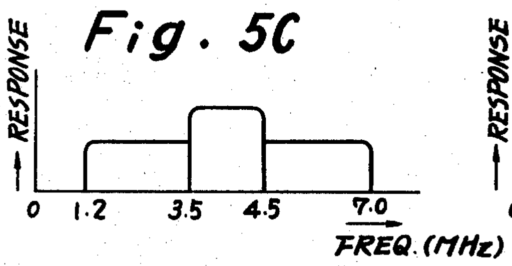
Figure 5D:
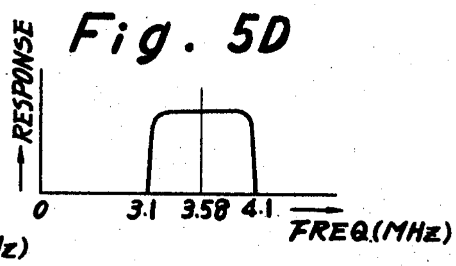
Figure 5E:
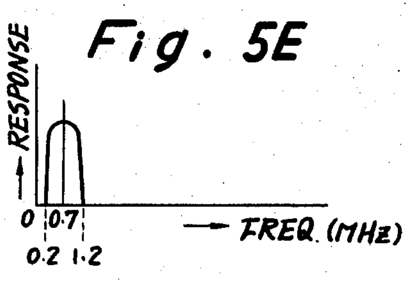
Figure 5F:
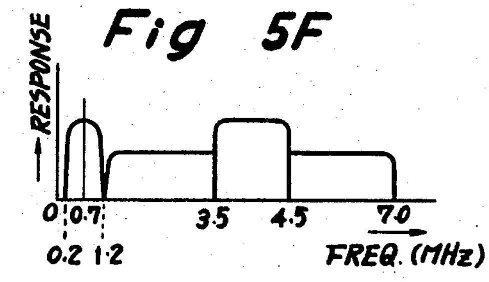

In the mixer 15, the frequency modulated signal from the high-pass filter 14 and the carrier chrominance signal from the band-pass filter 17 are superimposed one on the other to produce a signal as shown in FIG.5F. This signal is then amplified at a recording amplifier 19 and applied to rotary magnetic recording and reproducing heads 20, for example. This head may be part of any well known video tape recorder. The signal is thus recorded by the rotating magnetic heads 20 on a moving magnetic tape.

The video tape recorder used in the embodiments of this invention may include the two head helical scan system. In this type of system, the magnetic tape is brought into contact with and moved obliquely about the outer circumferential surface of a guide drum. The tape wraps circumferentially about approximately 180° of the guide drum. The two magnetic recording and reproducing heads are mounted on the peripheral edge of a rotary member, in positions which are diametrically opposed to each other. This rotary member is interposed between upper and lower portions of the guide drum. As a result, a video signal is recorded on and reproduced from the magnetic tape in tracks which lie obliquely, with respect to the longitudinal axis of the tape. During a first one-half revolution of the rotary member, one of the magnetic heads records or reproduces one field or one frame of the video signal in one linear track which is disposed obliquely relative to the longitudinal direction of the tape. During a second one-half revolution of the rotary member, the other magnetic head records or reproduces the next field or frame in a linear track disposed parallel to the preceding track.

Figure 1:
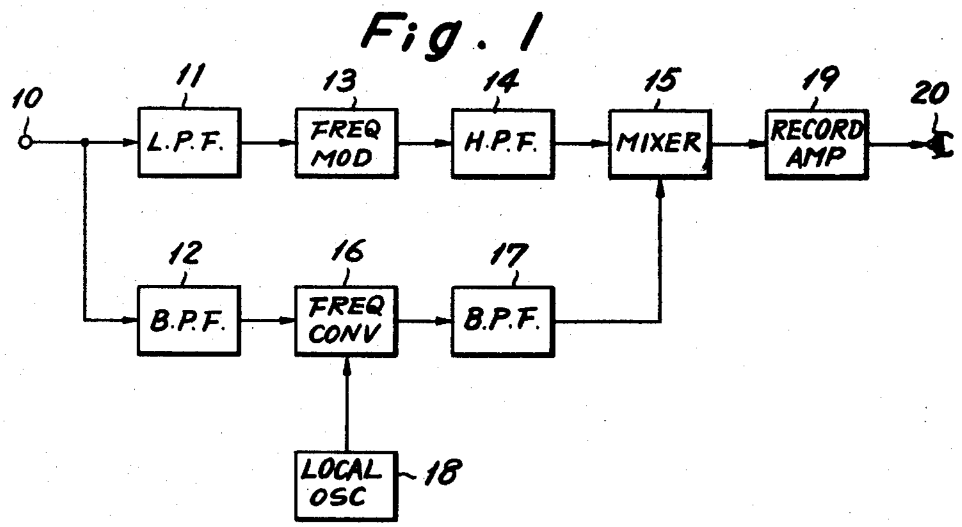
FIG. 1 is a block diagram of one embodiment of the recording side of system constructed according to this invention.

One desirable embodiment of frequency selection for the chrominance subcarrier of the frequency converted carrier chrominance signal will be described hereinbelow with reference to the same block diagram as shown in FIG.1.

As described hereinabove, a symmetrical distortion component is liable to be produced in the magnetic recording and reproducing processes. The distortion components are mostly the third distortion components. In the aforementioned recording system, a distortion is likely to occur due to a cross modulation between the frequency modululated signal and the frequency converted carrier chrominance signal. This distortion is responsible for the beat disturbance.

An embodiment described hereinbelow solves this problem. Here, the output signal frequency of the local oscillator 18 is designated as $fe$, the chrominance subcarrier frequency of the NTSC system color video signal as $fs$, the carrier frequency of the frequency modulated signal as $fc$ and the chrominance subcarrier frequency of the frequency modulated carrier chrominance signal as $fo$ ($=fe-fs$), respectively.

Two signals respectively having frequencies of $fc$ and $fo$ are respectively transmitted through a transmission system which produces the third distortion. Here, amplitudes of the signals are respectively designated as $K_1$ and $K_2$. Various frequency components are obtained by calculations based on devoloping a formula, $(K_1\cos 2\pi fct = K_2\cos 2\pi fot)^3$. Of these, frequency components, such components as $3fc$, $3fo$, $fc\pm 2fo$ and $2fc\pm fo$, are unnecessary components.

Of these unnecessary components, the frequency component $3fc$ does not become a disturbing component because it normally exists outside a frequency modulated wave band. The frequency components other than the component $3fc$ produce beat disturbances because they normally exist inside the frequency modulated wave band. The beat disturbances degrade the quality of the reproduced picture. When these frequency components are demodulated, they become disturbing signals having a frequency equal to the difference between the frequency modulated carrier wave and the frequency components, due to a characteristic of the frequency modulated signal. Accordingly, the frequencies of the disturbing signals which are frequency demodulated are $(fc-3fo)$, $2fo$ and $(fc\pm fo)$, respectively.

Actually, the frequency $fc$ is a frequency modulated luminance signal and, accordingly, is not a single frequency but a frequency which is always changing. The frequency $fo$; is the frequency of the chrominance subcarrier signal of the frequency converted carrier chrominance signal therefore, it is a constant frequency. As a result, the frequency components $(fc-3fo)$ and $(fc\pm fo)$ out of the disturbing signal frequency components are always changing together with the changing frequency $fc$. Therefore, these components do not produce such a conspicuous disturbing effect on the reproduced picture. However, the frequency component $2fo$ is relatively conspicuous on the reproduced picture because it is a constant frequency.

In view of the aforementioned fact, it it proposed in the present embodiment to set the frequency component $2fo$ at the least conspicuous frequency so that the best disturbances may, as a whole, become inconspicuous on the reproduced pictures.

Now, the frequency of the horizontal synchronizing signal is designated as $f_H$. A frequency which is obtained by multiplying $f_H/2$ by an odd number is relatively inconspicuous because it is cancelled in between the horizontal scanning lines. Accordingly, if the frequency $fo$ is selected to be a frequency which is $f_H/4 \times (2n + l)$ (where $n$ is integer), the beat disturbance will become least conspicuous.

The setting of the frequency $fo$ is set at the frequency $f_H/4 \times (2n + l)$ by selecting the output frequency $fe$ of the local oscillator 18 at a frequency of $fs + f_H/4 \times (2n + 1)$. Since the frequency $fs$ is selected to be a frequency of $(5 \times 7 \times 13/2) f_H$, the output frequency $fe$ of the local oscillator 18 may be selected to satisfy the following relationship. $fe = (5 \times 7 \times 13/2) + [(2n+1)4] f_H$ By setting the frequency $fe$ at the above relation, the effect of the beat disturbance will become least conspicuous on the reproduced picture.

Figure 6:
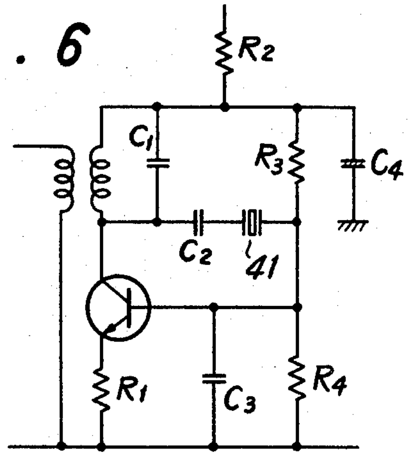
FIG. 6 is an electrical circuit diagram of one embodiment of a local oscillator shown in the diagram of FIG. 1.

In the present embodiment, $fs$ is at 3.579545 MHz, $fo$ at 688.374 KHz and $fe$ at 4.267919 MHz. FIG. 6 shows an electrical circuit of one embodiment of the local oscillator 18 which produces the frequency $fe$ of 4.267919 MHz. The constants of resistors $R_1$ to $R_4$ and capacitors $C_1$ to $C_3$ are shown hereinbelow. A crystal element 41 is connected between the capacitors $C_2$ and the connecting point of the resistors $R_3$ and $R_4$.

| | |
|---|---|
| Resistor | |
| $R_1$ | 330Ω |
| $R_2$ | 560Ω |
| $R_3$ | 33KΩ |
| $R_4$ | 3.3KΩ |
| Capacitor | |
| $C_1$ | 82PF |
| $C_2$ | 0.001F |
| $C_3$ | 100PF |

In another embodiment, the frequency $fe$ is produced from the chrominance subcarrier of the input color video signal. As a specific means to produce such frequency, a color burst signal is separated from the input color video signal. Then, a continuous signal is produced which has the same frequency and phase as the color burst signal. The frequency of this continuous signal is changed by frequency dividing, frequency multiplying or frequency converting whereby a signal having a frequency equal to the aforementioned frequency $fe$ is obtained.

By setting the frequency $fe$ at the aforementioned frequency, beat disturbances become least conspicuous. In the conventional systems, it was difficult to raise the recording level of the frequency converted carrier chrominance signal due to beat disturbance. In the system according to the present invention, the recording level can be raised because there is no danger of the beat disturbances in this system.

It should be noted that a signal having a frequency which is double that of the frequency converted carrier chrominance signal is a kind of disturbing signal. If a signal doubled in frequency is produced from the frequency converted carrier signal during the reproducing process, it will be the same wave as the disturbing wave which is superimposed on the frequency demodulated luminance signal. Accordingly, it is possible to reduce the disturbing wave by adding a wave having a frequency which is double that of the frequency converted carrier chrominance signal to the demodulated luminance signal in such a manner that the two signals are in opposite phase to each other. One embodiment applying this principle to the reproducing side will be described later.

Figure 2:
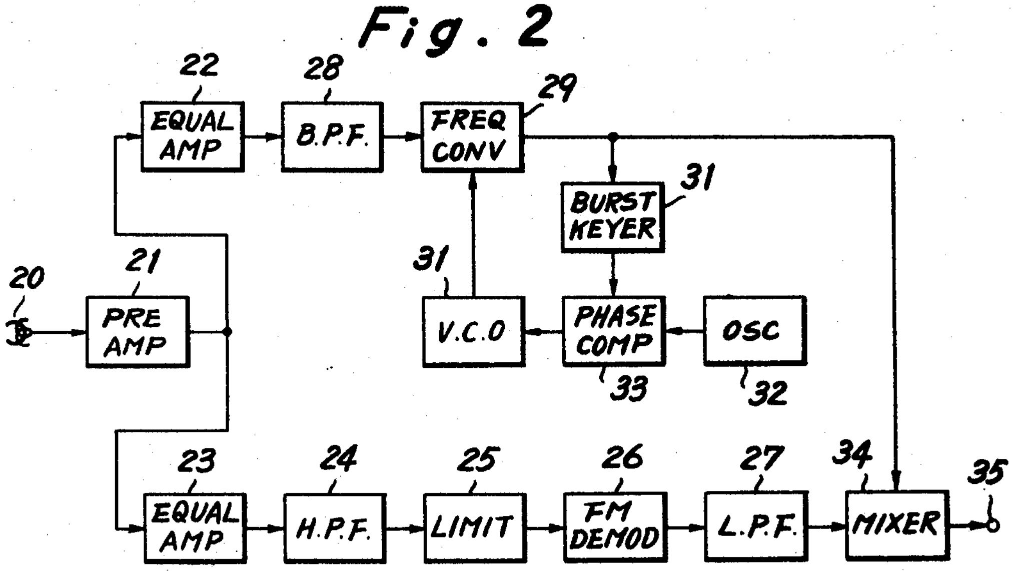
FIG. 2 is a block diagram of one embodiment of the reproducing side of a system constructed according to this invention.

A first embodiment of the reproducing side of a system constructed according to this invention is shown in FIG.2. A signal reproduced by the rotary magnetic recording and reproducing heads 20 is amplified at a preamplifier 21. FIG.5F shows the output signal from the preamplifier 21. This amplified signal is then supplied to equalizing amplifiers 22 and 23. The output signal from the equalizing amplifier 23 is supplied to a high-pass filter 24. There a frequency modulated signal (FIG.5C) is separated from the signal and applied to a limiter 25, where it is amplitude limited. Then, the frequency modulated signal is demodulated at a frequency demodulator 26. The frequency modulated carrier wave components are removed at a low-pass filter 27, to produce a luminance signal (FIG.5B).

A carrier chrominance signal of 0.2 to 1.2 MHz (FIG.5E) is separated at a band-pass filter 28, coupled to the output of the other equalizing amplifier 22. The separated carrier chrominance signal is then applied to a frequency converter 29, where it is converted by the output signal of a voltage control oscillator 30, having a center frequency of about 4.3 MHz. Thus, the separated carrier chrominance signal is restored to the original carrier chrominance signal having a subcarrier wave of 3.58 MHz (FIG.5D).

Then, the output of the frequency converter 29 is supplied to a burst keyer 31. A color burst signal is keyed and supplied to a phase comparator 33. This circuit compares the phase of the burst signal with the phase of the output signal of 3.58 MHz of a reference subcarrier oscillator 32. The oscillation frequency of the voltage control oscillator 30 is controlled by the output voltage of the phase comparator 33, which represents a detected phase error.

Figure 5G:
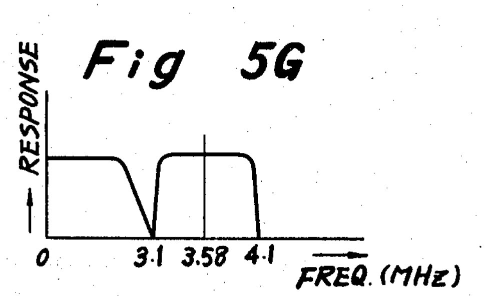

Thus, the frequency converter 29, burst keyer 31, phase comparator 33, voltage control oscillator 30 and frequency converter 29 are arranged, in the indicated order to form a feedback loop. This loop provides an automatic phase control circuit which brings the phase of the color burst signal of the carrier chrominance signal (the output of the frequency converter 29) into agreement with the phase of the output signal of the reference subcarrier oscillator 32. The reproduced carrier chrominance signal is thereby converted, at the frequency converter 29, into the original carrier chrominance signal having a subcarrier wave of 3.58 MHz. The resulting signal is supplied to a mixer 34 where it is superimposed on the luminance signal from the low-pass filter 27. This superimposition provides a reproduced color video signal of the spectrum shown in FIG.5G. It should be noted that timing axis variation is thus reduced.

The reason why a variation in the timing axis of the reproduced color video signal is reduced will be explained next. Basically, a variation in the timing axis of a signal is caused by either a variation in the rate of movement of the magnetic tape or an irregularity in the rotation of the magnetic heads at the time when a carrier chrominance signal is converted into a carrier chrominance signal having a subcarrier wave of 700 KHz.

Let us next examine the reduction in variation of the timing axis, of a carrier chrominance signal of 3.58 MHz. The signal is frequency converted into a signal of 700 KHz for recording and reproducing. Then returned to a signal of 3.58 MHz by frequency conversion. The variations of this signal will be compared with variation of the same signal of 3.58 MHz after recording and reproducing, but without being subjected to these frequency conversions. In the interest of brevity of the explanation, the carrier chrominance signal is represented by one frequency signal of its subcarrier frequency.

Assume that the amount of a variation in the timing axis of the carrier chrominance signal is ± 1 percent, 3.58 MHz ± 35.8 KHz (for the 3.58 MHz signal) - -(1)

700 KHz ± 7 KHz (for the 700 KHz signal) - - - (2)

Assume further that the 700 KHz signal is frequency converted into a 3.58 MHz signal by the output signal of the stable voltage control oscillator 30 having an oscillation center frequency 4.3 MHz. The variation contained in this signal will be as follows:

4.3 MHz − (700 KHz ± 7 KHz) ≈ 3.6 MHz ± 7 KHz - - - (3)

A comparision of the formula (1) and (3) shows that variations are about ± 35 KHz and about ∓ KHz respectively. Thus, the latter variation is about one-fifth the former variation. This shows that frequency conversion brings about a reduction of the variation in the timing axis to about one-fifth the original level.

However, the aforementioned automatic phase control circuit will make an error in operation if the frequency of the color burst signal is too far off synchronization. The carrier chrominance signal is frequency converted at the frequency converter 29, by the oscillation center frequency *fo* of the voltage control oscillation 30, which must be near the frequency ( ≈ 3.579545 MHz ± 10 Hz) of the output signal of the reference subcarrier oscillator 32. Generally, a simple type video tape recorder has no capstan servomechanism. Thus the frequency of the color burst signal of the reproduced carrier chrominance signal often fluctuates by over 0.2 percent.

Figure 3:
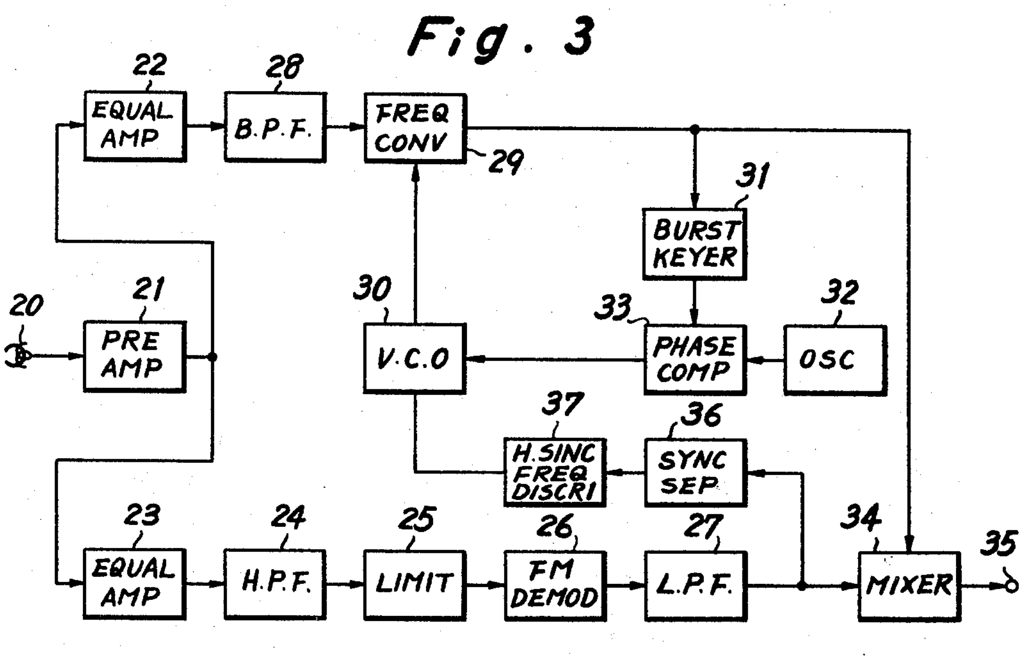
FIG. 3 is a block diagram of a second embodiment of the reproducing side of a system constructed according to this invention.

Next to be described is another aspect of the present invention shown in FIG.3. The explanation of the parts in FIG.3, which are designated by the same reference numerals as used in FIG. 2, is omitted.

The synchronizing signal is separated at a synchronizing signal separator 36 (FIG.3). Separation is from the luminance signal which is the output signal of the low-pass filter 27. The separated signal is them supplied to a horizontal synchronizing signal discriminator 37. There a discrimination of the frequency of the horizontal synchronizing signal is effected.

The horizontal synchronizing signal and carrier chrominance signal are subjected to the same amount of variation in the timing axis. Thus the output voltage of the frequency discriminator 37 has a variation which is proportional to the variation in the subcarrier frequency of the reproduced carrier chrominance signal. The output voltage of the frequency discriminator 37 is used to control the oscillation center frequency of the voltage control oscillator 30. Accordingly, it is possible to reduce the variation in the timing axis to less than ± 0.2 percent.

The output of the frequency discriminator 37 controls the voltage control oscillator 30. This control enables the aforementioned automatic phase control circuit to operate in a stable manner even though the subcarrier frequency of the reproduced carrier chrominance signal shows a variation in the timing axis of about ± 0.2 percent. Thus, the present invention makes it possible to stabilize the phase of the reproduced carrier chrominance signal, even when the rate of movement of the magnetic tape has a large fluctuation. It is to be understood that the system according to this invention can perform a similar function even if the frequency discriminator 37 for the horizontal synchronizing signal is replaced by a frequency discriminator for the color burst signal. The present invention removes a large variation in the timing axis of the reproduced carrier chrominance signal.

Figure 4:
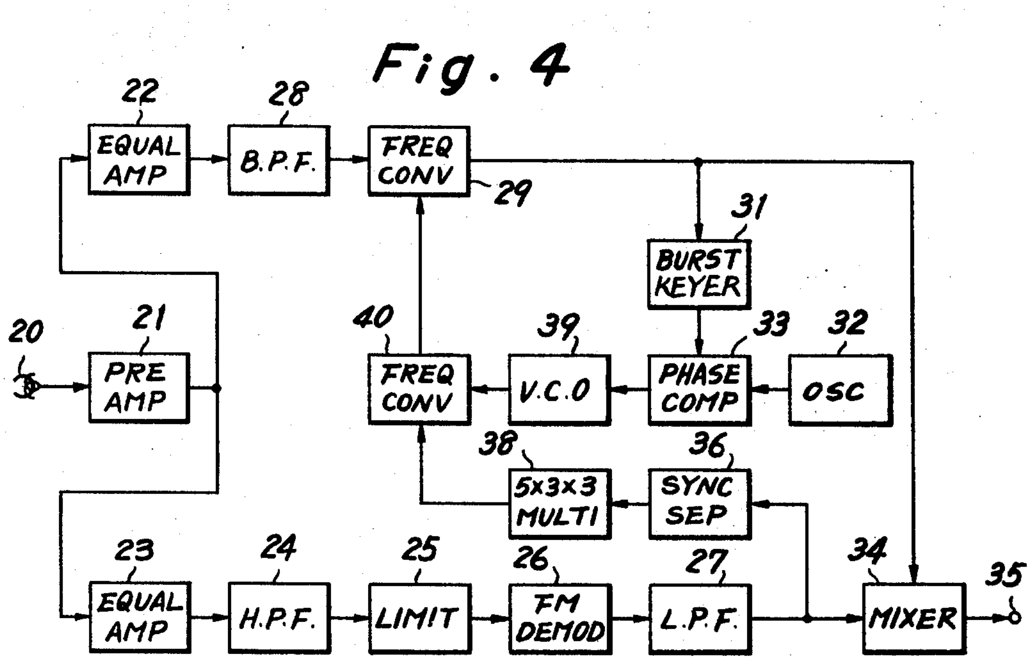
FIG. 4 is a block diagram of a third embodiment of the reproducing side of a system constructed according to this invention.

A third embodiment of the reproducing side of a system, constructed according to this invention, will be explained with reference to FIG.4. In FIG.4, like reference characters designate parts similar to those shown in FIGS.2 and 3, and the explanation of such parts is omitted.

In this embodiment, the center frequency of the voltage control oscillator 30 is not directly controlled by the output of the phase comparator 33 as in the embodiments shown in FIGS.2 and 3; rather, it is indirectly controlled thereby. More specifically, a multiplier circuit 38 multiples the basic component of the horizontal synchronizing signal by 5 × 3 × 3, to become substantially 700 KHz. This frequency lies in the neighborhood of the chrominance subcarrier frequency. This frequency is near the subcarrier frequency of the reproduced carrier chrominance signal. Also, this multiplied signal has a frequency variation which is substantially equal to the frequency variation in the reproduced carrier chrominance signal.

A voltage control oscillator 39 has a center frequency of about 3.58 MHz, which is controlled by the output of the phase comparator 33. A frequency converter 40 converts the output signal of about 700 KHz of the multiplier circuit 38 responsive to the output signal of the voltage control oscillator 39. This produces an output signal of 4.3 MHz which is used to frequency convert the reproduced carrier chrominance signal at the frequency converter 29. In this embodiment, the feedback loop comprises the frequency converter 29, color burst keyer 31, phase comparator 33, voltage control oscillator 39, frequency converter 40 and frequency converter 29. This feedback loop constitutes an automatic phase control circuit for removing a variation in the timing axis. The frequency converter 40 produces an output signal having a frequency which corresponds to the oscillation frequency of the voltage control oscillator 39, plus about 700 KHz. The signal of about 700 KHz has a frequency variation approximately equal to that of the subcarrier frequency of the reproduced carrier chrominance signal. Thus, the frequency converter 40 and the voltage control oscillator 39 have substantially the same effect upon the control of the center frequency. It will be understood that this embodiment stabilizes the phase of the reproduced carrier chrominance signal having a large timing axis variation.

Figure 7:
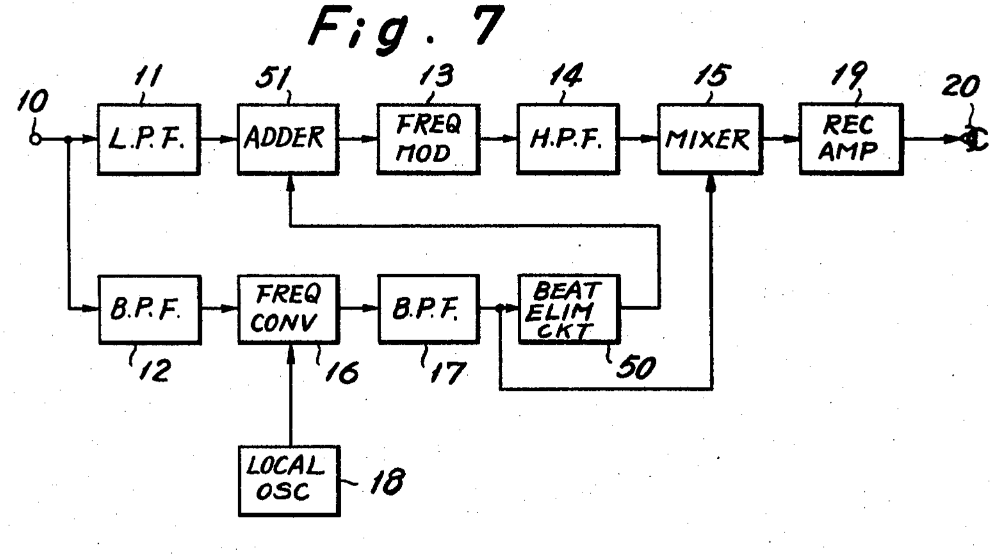
FIG. 7 is a block diagram showing a second embodiment of the recording side of a system constructed according to this invention.

Next, a second embodiment of the recording side of the system, constructed according to this invention, will be illustrated with reference to FIG.7. In FIG.7, like reference characters designate parts similar to those shown in FIG.1, and the explanation thereof is omitted.

The carrier chrominance signal is frequency converted into a low frequency band by the frequency converter 16. Then, the unnecessary components are removed at the band-pass filter 17. The carrier chrominance signal having the chrominance subcarrier of 700 KHz is taken out. A wave having a frequency which is double that of the carrier chrominance signal causes cross modulation in the processes of recording the reproducing on the magnetic tape. The beat disturbances are thereby produced in the demodulated luminance signal. In the present embodiment, therefore, a component which is in opposite phase to the beat component produced in the demodulated luminance signal in the recording and reproducing processes is superimposed on the luminance signal in the recording side.

The carrier chrominance signal passed through the band-pass filter 17 is supplied, on one hand, to the mixer 15 and, on the other hand, to a beat eliminating circuit 50. In the beat eliminating circuit 50, a signal which is in opposite phase to the aforementioned beat component is produced. This produced signal is supplied to an adder 51, where it is added to an output luminance signal of the low-pass filter 11. The output signal of the adder 51 is frequency modulated at the frequency modulator 13 and thereafter is supplied to the high-pass filter 14 and thence to the mixer 15. The output signal of the mixer 15 is amplified at the recording amplifier 19 and is then recorded on the magnetic tape by means of the magnetic heads 20.

Thus, the superimposing of the signal having the frequency which is double that of the carrier chrominance signal on the luminance signal in opposite phase prevents occurrence of beats due to cross modulation.

Instead of providing the beat eliminating circuit on the recording side as described in the aforementioned embodiment, such beat eliminating circuit may be provided on the reproducing side as will be illustrated hereinbelow with reference to FIG.8.

Figure 8:
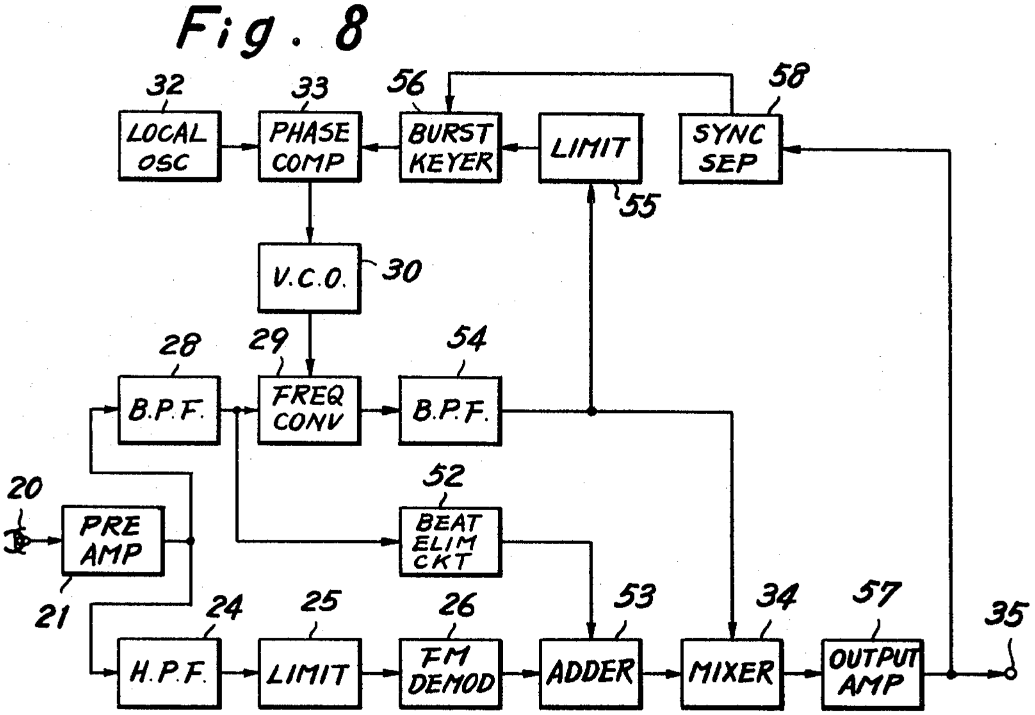
FIG. 8 is a block diagram of a fourth embodiment of the reproducing side of a system constructed according to this invention.

In FIG.8, like reference characters designate parts similar to those shown in FIG.3, and the explanation thereof is omitted. In FIG.8, due to cross modulation which takes place in the recording and reproducing processes on the magnetic tape, the luminance signal demodulated at the frequency demodulator 26 contains the wave having the frequency which is double that of the carrier chrominance signal converted into the low frequency band.

An output low band converted carrier chrominance signal of the band-pass filter 28 is applied to the frequency converter 29 and is also applied to a beat eliminating circuit 52. The output of the beat eliminating circuit 52 is a signal which has a frequency double that of the low band converted carrier chrominance signal and is of an opposite phase thereto. This signal is applied to an adder 53 and is added to the luminance signal from the demodulator 26. Here, the beat component having a frequency which is equal to double that of the converted carrier chrominance signal in the luminance signal is cancelled.

The carrier chrominance signal has the chrominance subcarrier of 3.58 MHz has been frequency converted at the frequency converter 29 and restored to its original frequency. It is supplied, through a band-pass filter 54, to the mixer 34 and an amplitude limiter 55. The signal limited in amplitude by the amplitude limiter 55 is applied to a burst keyer 56. On the other hand, a part of the output of the mixer 34 is supplied, through an output amplifier 57, to a synchronizing signal separator 58 where the synchronizing signal is separated. The separated synchronizing signal is applied to the burst keyer 56.

A burst signal is keyed and supplied to the phase comparator 33. This is somewhat similar to the feedback loop of the embodiment shown in FIG.2. The frequency converter 29, band-pass filter 54, limiter 55, burst keyer 56, phase comparator 33, voltage control oscillator 30 and frequency converter 29 are arranged, in the indicated order, to form a loop of an automatic phase control circuit. By this arrangement, a timing axis variation of the reproduced carrier chrominance signal is corrected.

In the system of the aforementioned embodiment, the beat component in the luminance signal from the demodulator 26 is effectively cancelled by the opposite phase signal from the beat eliminating circuit 52.

The beat eliminating circuit may be provided either on the recording side or the reproducing side. Next, a circuit diagram of one embodiment of the beat eliminating circuits 50 and 52 is shown in FIG.9.

Figure 9:
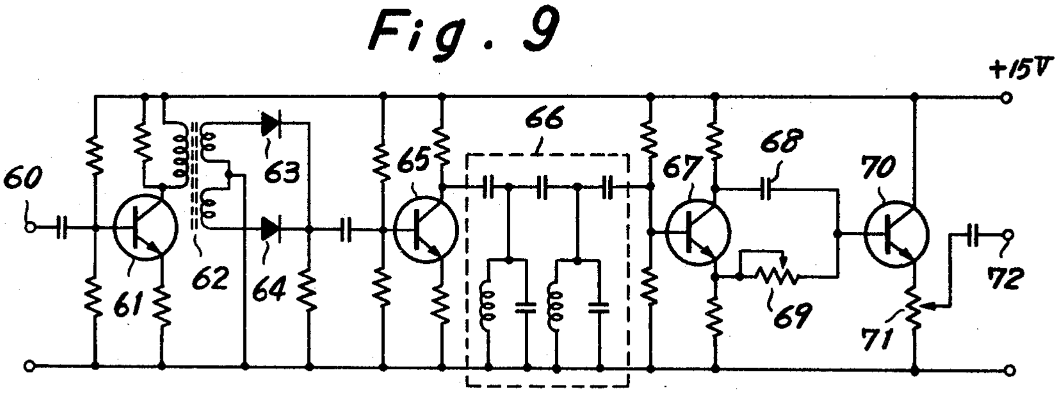
FIG. 9 is an electrical circuit diagram of one embodiment of a beat eliminating circuit shown in the diagram of FIG.8.

In FIG.9, the carrier chrominance signal which has been frequency converted to the low frequency band is applied, through an input terminal 60, to the base of a transistor 61. The carrier chrominance signal is amplified at the transistor 61 and is phase inverted at a transformer 62. On the output side of the transformer 62, two waves of positive phase and negative phase are produced. These two waves are rectified by diodes 63 and 64. The diodes 63 and 64 form a sort of full-wave rectifying circuit. A fundamental wave is removed by this rectifying circuit and signals which principally contain a wave of the double frequency are obtained.

This signals which principally contain the wave of double frequency are applied to the base of a transistor 65 and are amplified there. The amplified signals are then applied to a band-pass filter 66 enclosed by a broken line in the figure. There components other than the wave of double frequency are removed and only the double frequency wave component is taken out. This double frequency wave component is applied to the base of a transistor 67. The transistor 67, a capacitor 68 and a variable resistor 69 form a phase shifting circuit. The variable resistor 69 effects phase adjustment. The double frequency wave component is adjusted in its phase in this phase shifting circuit and is then applied to the base of a transistor 70 which is of an emitter follower connection. The output level is adjusted by a variable resistor 71 which is connected to the emitter of the transistor 70. The output is taken out of an output terminal 72 through a sliding contact member of the variable resistor 71.

Sliding members of the phase shifting variable resistor 69 and the output level adjusting variable resistor 71 are respectively adjusted to positions where the beat component is minimized. Thus, the beat component produced during the recording and reproducing processes is effectively eliminated.

From the foregoing description, it will be appreciated that the system according to this invention offers many advantages. The carrier chrominance signal is not passed through the frequency modulation system and frequency demodulation system for the low-band carrier. Therefore, the system is free from the danger of producing beats, which are characteristic of the low-band carrier wave FM system. It is possible to correct large timing axis variations of the reproduced carrier chrominance signal. Moreover, the system has very little differential gain and differential phase, because the carrier chrominance signal and luminance signal are separated from each other.

Furthermore, beat disturbance is made inconspicuous on the reproduced picture by setting the oscillation output frequency of the local oscillator to be a predetermined frequency in frequency modulating the carrier chrominance signal. Disturbance caused by the signal having the frequency which is double that of the chrominance subcarrier is effectively eliminated by adding the signal of opposite phase produced in the beat eliminating circuit to the luminance signal.

While the present invention has been described with reference to preferred embodiments, it is to be understood that the invention is not limited thereto, and that many changes and modifications may be made therein. Thus the appended claims are intended as covering all equivalents falling within the true spirit and scope of the invention.

What I claim is:

1. A color video signal recording and reproducing system comprising first filter means for separating a luminance signal from a color video signal, modulator means for frequency-modulating a carrier wave responsive to said luminance signal, second filter means for separating a carrier chrominance signal from said color video signal, first frequency converter means for converting the frequency band of the carrier chrominance signal to a frequency band which is lower than frequencies occupied by the luminance signal output of said modulator means and in which the frequency of the subcarrier of the chrominance signal output of said frequency converter means is substantially equal to $fH/4 \times (2n + 1)$ (where $fH$ is the frequency of the horizontal synchronizing signal of said color video signal and $n$ is a positive integral number), means for superimposing the luminance signal output of said modulator means and the carrier chrominance signal output of said first frequency converter means one on the other, means for recording and reproducing the superimposed signal on a magnetic medium, third filter means for separating a frequency-modulated luminance signal from a signal reproduced by said recording and reproducing means, means for demodulating said luminance signal, fourth filter means for separating the frequency converted carrier chrominance signal from the said signal reproduced from said magnetic medium, and second frequency converter means for restoring the frequency band of the output carrier chrominance signal of said fourth filter means to the original frequency band.

2. The system of claim 1 wherein said first frequency converter means comprises a frequency converter, and a local oscillator which applies an output oscillation frequency for frequency conversion to said frequency converter, said output oscillation frequency of the local oscillator being a frequency which is substantially equal to $fs + fH/4 \times (2n + 1)$ (where $fs$ is the frequency of the subcarrier of the carrier chrominance signal prior to the frequency conversion).

3. The system of claim 2 wherein said output oscillation frequency of the local oscillator is approximately 4.267919 MHz.

4. The system of claim 1 which further comprises a color burst keyer for keying a color burst signal from the output signal of said second frequency converter means, oscillator means for producing a reference subcarrier signal, means for comparing the phase of said color burst signal with the phase of the output signal of said oscillator means and for producing an error signal corresponding to the phase difference between both signals, and means including a voltage control oscillator having a center frequency of oscillation which is controlled by said error signal for supplying an output to said frequency converter means whereby it constitutes a feedback loop together with said color burst keyer and said comparator means.

5. The system of claim 4 which further comprises means for separating a horizontal synchronizing signal from said reproduced signal, and frequency discriminator means for discriminating the frequency of the horizontal synchronizing signal separated by said separator means, said means for controlling the center frequency being means responsive to the output voltage of said frequency discriminator means together with said error signal for controlling the center frequency of oscillation of said voltage control oscillator means, said center frequency of oscillation having a frequency variation which is proportional to the frequency variation of the subcarrier of the reproduced carrier chrominance signal.

6. The system of claim 1 which further comprises color burst keyer means for keying a color burst signal responsive to the output signal of said second frequency converter means, oscillator means for producing a reference subcarrier signal, means for comparing the phase of said color burst signal with the phase of the output signal of said oscillator means and producing an error signal corresponding to the phase difference between both signals, voltage control oscillator means having a center frequency of oscillation which is controlled responsive to said error signal, means for separating a horizontal synchronizing signal from said reproduced signal, multiplier means for multiplying the frequency of the basic wave component of said horizontal synchronizing signal to a frequency near the subcarrier frequency of the frequency converted carrier chrominance signal, and third frequency converter means for frequency converting the output signal of said multiplier means responsive to the output of said voltage control oscillator means and for providing an output signal which is supplied to said second frequency converter means, thereby constituting a feedback loop together with said color burst keyer means and said phase comparator means.

7. A color video signal recording and reproducing system comprising first filter means for separating a luminance signal from a color video signal, second filter means for separating a carrier chrominance signal from said color video signal, first frequency converter means for converting the frequency band of the carrier chrominance signal to a lower frequency band, means responsive to the carrier chrominance signal which has been frequency converted by said first frequency converter means for obtaining a signal having a frequency which is double the carrier frequency of the frequency converted carrier chrominance signal, adding means for adding the double frequency signal to the luminance signal from said first filter means, modulator means for frequency modulating a carrier signal with the output signal of said adding means, said lower frequency band being lower than frequencies occupied by the frequency modulated signal from said modulator means, means for superimposing the frequency modulated signal and the carrier chrominance signal output of said first frequency converter means one on the other, means for recording and reproducing the superimposed signal on a magnetic medium, third filter means for separating a frequency modulated signal from a signal reproduced by said recording and reproducing means, means for demodulating the luminance signal, said double frequency signal being in opposite phase to a wave which will be produced in the demodulated luminance signal during recording and reproducing of the superimposed signal on the magnetic medium and has a frequency which is double the carrier frequency of the frequency converted carrier chrominance signal, fourth filter means for separating the frequency converted carrier chrominance signal from said signal reproduced from said magnetic medium, and second frequency converter means for restoring the frequency band of the output carrier chrominance signal of said fourth filter means to the original frequency band.

8. The system of claim 7 which further comprises a color burst keyer for keying a color burst signal from the output signal of said second frequency converter means, oscillator means for producing a reference subcarrier signal, means for comparing the phase of said color burst signal with the phase of the output signal of said oscillator means and producing an error signal corresponding to the phase difference between both signals, and means including a voltage control oscillator having a center frequency of oscillation which is controlled by said error signal for supplying an output to said frequency converter means whereby it constitutes a feedback loop together with said color burst keyer and said phase comparator means.

9. The system of claim 8 which further comprises means for separating a horizontal synchronizing signal from said reproduced signal, and frequency discriminator means for discriminating the frequency of the horizontal synchronizing signal separated by said separator means, said means for controlling the center frequency being means responsive to the output voltage of said frequency discriminator means together with said error signal for controlling the center frequency of oscillation of said voltage control oscillator means, said center frequency of oscillation having a frequency variation which is proportional to the frequency variation of the subcarrier of the reproduced carrier chrominance signal.

10. The system of claim 7 which further comprises color burst keyer means for keying a color burst signal responsive to the output signal of said second frequency converter means, oscillator means for producing a reference subcarrier signal, means for comparing the phase of said color burst signal with the phase of the output signal of said oscillator means and producing an error signal corresponding to the phase difference between both signals, voltage control oscillator means having a center frequency of oscillation which is controlled responsive to said error signal, means for separating a horizontal synchronizing signal from said reproduced signal, multiplier means for multiplying the frequency of the basic wave component of said horizontal synchronizing signal to a frequency near the subcarrier frequency of the frequency converted carrier chrominance signal, and third frequency converter means for frequency converting the output signal of said multiplier means responsive to the output of said voltage control oscillator means and for providing an output signal which is supplied to said second frequency converter means, thereby constituting a feedback loop together with said color burst keyer means and said phase comparator means.

11. A color video signal recording and reproducing system comprising first filter means for separating a luminance signal from a color video signal, modulator means for frequency-modulating a carrier wave with said luminance signal, second filter means for separating a carrier chrominance signal from said color video signal, first frequency converter means for converting the frequency band of the carrier chrominance signal to a frequency band which is lower than frequencies occupied by the luminance signal output of said modulator means, means for superimposing the luminance signal output of said modulator means and the carrier chrominance signal output of said first frequency converter means one on the other, means for recording and reproducing the superimposed signal on a magnetic medium, third filter means for separating a frequency-modulated luminance signal from a signal reproduced by said recording and reproducing means, means for demodulating said luminance signal, fourth filter means for separating the frequency converted carrier chrominance signal from said signal reproduced from said magnetic medium, means responsive to the frequency converted carrier chrominance signal separated by said fourth filter means for obtaining a signal having a frequency which is double the subcarrier frequency of said frequency converted carrier chrominance signal, means for adding said double frequency signal to the luminance signal demodulated by said demodulating means, said double frequency signal being in opposite phase to a wave which is produced in the demodulated luminance signal during recording and reproducing of the superimposed signal on the magnetic medium and has a frequency which is double the subcarrier frequency of the frequency converted carrier chrominance signal from said first frequency converter means, and second frequency converter means for restoring the frequency band of the output carrier chrominance signal of said fourth filter means to the original frequency band.

12. The system of claim 11 which further comprises a color burst keyer for keying a color burst signal from the output signal of said second frequency converter means, oscillator means for producing a reference subcarrier signal, means for comparing the phase of said color burst signal with the phase of the output signal of said oscillator means and producing an error signal corresponding to the phase difference between both signals, and means including a voltage control oscillator having a center frequency of oscillation which is controlled by said error signal for supplying an output to said frequency converter means whereby it constitutes a feedback loop together with said color burst keyer and said phase comparator means.

13. The system of claim 12 which further comprises means for separating a horizontal synchronizing signal from said reproduced signal, and frequency discriminator means for discriminating the frequency of the horizontal synchronizing signal separated by said separator means, said means for controlling the center frequency being means responsive to the output voltage of said frequency discriminator means together with said error signal for controlling the center frequency of oscillation of said voltage control oscillator means, said center frequency of oscillation having a frequency variation which is proportional to the frequency variation of the subcarrier of the reproduced carrier chrominance signal.

14. The system of claim 11 which further comprises color burst keyer means for keying a color burst signal responsive to the output signal of said second frequency converter means, oscillator means for producing a reference subcarrier signal, means for comparing the phase of said color burst signal with the phase of the output signal of said oscillator means and producing an error signal corresponding to the phase difference between both signals, voltage control oscillator means having a center frequency of oscillation which is controlled responsive to said error signal, means for separating a horizontal synchronizing signal from said reproduced signal, multiplier means for multiplying the frequency of the basic wave component of said horizontal synchronizing signal to a frequency near the subcarrier frequency of the frequency converted carrier chrominance signal, and third frequency converter means for frequency converting the output signal of said multiplier means responsive to the output of said voltage control oscillator means and for providing an output signal which is supplied to said second frequency converter means, thereby constituting a feedback loop together with said color burst keyer means and said phase comparator means.

* * * * *